(12) United States Patent
Jurczyk et al.

(10) Patent No.: US 7,640,992 B2
(45) Date of Patent: Jan. 5, 2010

(54) THROTTLE VALVE FOR INJECTING A FLUID INTO GEOLOGICAL FORMATIONS

(75) Inventors: Andreas Jurczyk, Fredersdorf (DE); Peter Otto, Potsdam (DE); Oliver Kastner, Schwielowsee/OT Geltow (DE); Björn Legarth, Berlin (DE)

(73) Assignee: Helmholtz-Zentrum Potsdam Deutsches GeoForschungsZentrum-GFZ, Potsdam (DE)

( * ) Notice: Subject to any disclaimer, the term of this patent is extended or adjusted under 35 U.S.C. 154(b) by 293 days.

(21) Appl. No.: 11/810,815

(22) Filed: Jun. 7, 2007

(65) Prior Publication Data
US 2007/0295512 A1   Dec. 27, 2007

(51) Int. Cl.
*E21B 34/10* (2006.01)

(52) U.S. Cl. .................. 166/374; 166/320; 166/324; 166/373

(58) Field of Classification Search .......... 166/373, 166/320, 324; 137/504
See application file for complete search history.

(56) References Cited

U.S. PATENT DOCUMENTS 5,320,181 A  6/1994  Lantier et al.
5,535,983 A  7/1996  Hohermuth

FOREIGN PATENT DOCUMENTS

| DE | 2549113 A1 | 4/1977 |
|---|---|---|
| DE | 3685640 T2 | 1/1993 |
| DE | 69629973 T2 | 5/2004 |
| EP | 0986690 B1 | 2/2003 |
| EP | 1035360 B1 | 8/2004 |
| WO | WO 92/03676 A1 | 3/1992 |

*Primary Examiner*—Giovanna C Wright
(74) *Attorney, Agent, or Firm*—Drinker Biddle & Reath LLP (57) ABSTRACT

A throttle valve (10), in particular for injecting a fluid into a geological formation, is described, which comprises a valve body (10) having a piston chamber (11), an annular piston (20) having a fluid channel (21), which extends from a high-pressure side (H) to a low-pressure side (L) of the throttle valve, with the annular piston (20) being displaceable within the piston chamber (11) and the fluid channel (21) being transmissive or closed depending on the position of the annular piston (20) in the piston chamber (11), and a cover plate (12) which is provided on the high-pressure side of the valve body (10) and through which the fluid channel (21) protrudes from the high-pressure side piston chamber (11), wherein the fluid channel (21) is closed in axial direction with a sealing disk (22) which can be rested tightly on the cover plate (12) on the high-pressure side, and the fluid channel (21) has a radial throttle opening (23) adjacent to the sealing disk (22). A fluid injection device having such a throttle valve is also described.

32 Claims, 4 Drawing Sheets

THROTTLE VALVE FOR INJECTING A FLUID INTO GEOLOGICAL FORMATIONS

CROSS-REFERENCE TO RELATED APPLICATIONS

This application claims the priority of German Application No. DE 10 2006 027 705.8, filed on Jun. 14, 2006, which is incorporated herein by reference in its entirety.

BACKGROUND

The invention relates to a throttle valve, and a fluid injection device which is provided with such a throttle valve, for injecting a fluid into a geological formation, and a method for injecting a fluid into a geological formation. The invention further relates to methods for mounting and demounting the throttle valve in an injection tube section.

It is known to store carbon dioxide ($CO_2$) which is produced during natural gas processing or combustion processes in geological formations. Storage of carbon dioxide takes place typically by way of an injection tube which reaches into the geological formation. For reasons of stability, the injection tube is disposed in a bore hole which is encased and cemented as far as the lower region. In order to create a hydraulic communication with the rock formation, the tubes are subsequently perforated in selected regions. From the end region of the injection tube, the $CO_2$ is to be filled over a large space into the pores of the rock of the geological formation.

The injection of $CO_2$ in the liquid state is provided in a technical realization known from practice. With a density of approximately 0.7 kg/dm$^3$ and the required condensation pressure for $CO_2$ during the feeding (approx. 65 bar), at the deepest end of the bore hole (approx. 800 m) the ambient pressure in the geological formation is significantly exceeded by the pressure of the liquid $CO_2$. As a result of the high overpressure, there is a danger of an unwanted change of the rock due to cracks, which can also propagate through the covering layer (e.g. clay or salt) above the storing formation. There is therefore an interest in reducing the pressure of the liquid $CO_2$ in the bore hole by way of a throttle valve.

Numerous types of valves for regulating and interrupting fluid streams are known in all areas of technology. Valves can be differentiated according to the sealing properties, the control properties, the type of drive, the medium flowing through or the application field. By way of example, pinch valves are known from patent documents EP 1 035 360, U.S. Pat. No. 5,535,983 and WO 92/03676, in which the cross-section of a hose-like segment is reduced by an external radial pressure. Although the pinch valves enable a reliable closing function, disadvantages can however result from limited control properties. DE 36 85 640 T2 describes an underground sliding sleeve valve and its installation in a tube. A bore hole valve having a selectively movable valve element is known from EP 0 986 690 B1. DE 69 629 973 discloses a remotely controlled valve having a movable valve stem, which can be activated with the help of liquid. These conventional-valves have disadvantages due to a complex construction and limited functional reliability.

DE 2 549 113 describes a sleeve valve in which the closed state is dependent on the position of a cylindrical sleeve relative to a valve plate. The sleeve is connected to a annular piston, which is mounted in a cylinder with freedom to slide. By applying a pressure medium to the cylinder, the annular piston can be displaced and the sleeve valve actuated in this way. Due to its complex construction and limited ability to accurately adjust the pressure reduction, in particular under high pressure conditions, the sleeve valve according to DE 2 549 113 has significant disadvantages, due to which a use in geotechnical tasks and especially for the injection of $CO_2$, is excluded.

Furthermore, conventional valves generally have at least one of the following disadvantages. Firstly, they do not have both a reliable closing function and a distinctive regulation behavior. Secondly, the energy for the regulation must be supplied by way of separate fluidic or electric lines. Significant limitations with respect to maintenance and exchangeability of the conventional valves represent a further disadvantage.

It is the object of the invention to provide an improved throttle valve, in particular for injecting a fluid into an underground storage, with which the disadvantages of the conventional throttle valves are avoided. It is a further object of the invention to provide an improved fluid injection device with which the disadvantages and limitations of the conventional techniques for injecting fluids into underground storages are avoided. Another object of the invention is to provide an improved method for injecting a fluid into an underground storage, in particular into a geological formation.

SUMMARY

These objects are achieved by a throttle valve, a fluid injection device and an injection method as described and depicted herein.

With respect to the device, according to a first aspect, the invention is based on the general technical teaching of providing a throttle valve comprising a fluid channel, which is part of an annular piston which is displaceable by application of pressure. The fluid channel represents a closable and controllable connection between a high-pressure side and a low-pressure side of the throttle valve. On the low-pressure side, the fluid channel has an open end. On the high-pressure side there are provided an end which is closed off by a laterally projecting sealing disk in longitudinal direction (axial direction) of the throttle valve and a lateral (radial) throttle opening. Depending on the setting of the annular piston, the fluid channel can be positioned so that the sealing disk rests tightly closing on a cover plate provided on the high-pressure side (closed state) or the lateral throttle opening is freed (controllable flow-through state). The lateral throttle opening of the fluid channel acts in conjunction with the cover plate of the throttle valve in such a way that, in the flow-through state, depending on the setting of the annular piston, part of the throttle opening is covered by the cover plate or the throttle opening is completely freed.

Advantageously, the throttle valve has a compact design, which is adapted to the geometrical conditions in the bore hole and has a high pressure resistance, with the closing and flow-through functions of the throttle valve being individually optimized by the provision of the sealing disk and of the lateral throttle opening, respectively. The throttle valve achieves both a reliable closing function and a precise, controllable opening in the flow-through state, thus allowing liquid fluids, in particular liquid $CO_2$, to be introduced into a geological formation at the permissible injection pressure with high reliability and safety.

According to a preferred embodiment of the invention, the throttle opening has a geometrical shape (throttle contour) comprising a widening or enlargement in the longitudinal direction towards the low-pressure side of the throttle valve, e.g. a triangle shape. Advantageously, the flow-through function of the throttle valve therewith obtains a distinctive, non-linear characteristic curve. For a given displacement of the annular piston, an increase in the opening of the throttle valve results in each case in an increase of the opening increment. Advantageously, this enables the accuracy of the throttle valve control to be improved during the opening and in the flow-through state.

The annular piston of the piston valve of the pre-cited type is arranged in a piston chamber, which has on both sides of the annular piston corresponding annular spaces on the high-pressure side and on the low-pressure side. In a preferred embodiment of the invention, the low-pressure side annular space is provided in order to have a working pressure applied thereto for actuating the throttle valve. Advantageously, in the case of a loss of the working pressure, the annular piston is transferred to the closed state by the pressure of the fluid to be injected, which is acting on the high-pressure side. For this, according to the invention, the fluid channel has a lateral connection opening via which the fluid channel is connected to the high-pressure side annular space.

A throttle line is preferably provided for applying the working pressure to the low-pressure side annular space, via which a connection of the low-pressure side annular space to the surroundings can be created. Advantageously, due to the hydraulic application of pressure to the throttle valve, a single throttle line through the valve body of the throttle valve is sufficient, so that the compact and stable design of the throttle valve is not affected. In addition, the throttle line improves the operating safety. In the ease of, for example, an unwanted pressure drop, this fault leads to the automatic closing of the throttle valve. Even if the pressure drop takes place abruptly, the throttling function of the throttle line prevents a pressure surge at the throttle valve.

According to the invention, the valve body of the throttle valve can have a radially symmetric outer shape relative to the longitudinal extension of the piston chamber. Preferably, there are seals provided on the surface of the valve body, which, with the throttle valve being inserted, interact with the inner wall of a valve seat in order to take up the throttle valve. According to a further preferred embodiment of the invention, the valve seat for the throttle valve is arranged as part of an injection tube which leads into the geological formation. The integration of the valve seat into the injection tube results in advantages for the compact insertion of the throttle valve in the injection tube.

According to a further preferred embodiment of the invention, there is provided an opening valve which enables the connection of the low-pressure side annular space to the surroundings to be closed. According to a preferred embodiment, the opening valve can be mechanically actuable in such a way that it is open when the throttle valve is inserted in the injection tube, and closed when the throttle valve is not inserted in the injection tube. Advantageously, in this case the working pressure is only applied to the interior of the injection tube when the throttle valve is inserted in the injection tube.

Preferably, the opening valve is part of the valve seat so that a connection between the surroundings of the valve seat, in particular of the injection tube, and the throttle line and the piston chamber of the valve body is created via the opening valve. For the mechanical actuation of the opening valve it is preferably provided for the opening valve to be opened when the throttle valve is inserted in the valve seat. The opening valve is spring-mounted in a passage opening of the valve seat. An external spring causes the opening valve to close when the throttle valve is removed from the valve seat.

The mountability of the throttle valve is advantageously simplified in case, according to a further preferred embodiment of the invention, the valve body has at least one radially acting engagement device. Preferably, as engagement device there is provided at least one locking lever, which is radially pivotable by spring means, for engaging the valve body in a protrusion in the valve seat or in the injection tube. Alternatively or additionally, there is further preferably provided an internal mounting groove of the valve body, which is arranged for the engagement of a mounting tool. Particularly preferably, the at least one radial locking lever and the internal mounting groove form part of a tool mount, into which a mounting tool of the throttle valve can be inserted. In the inserted state of the mounting tool, the radial locking lever is pivoted in such a way that the engagement with the injection tube or the valve seat is released, thus enabling the throttle valve to be drawn out of the injection tube by engaging a mounting tool in the mounting groove.

The mounting tool for engaging in the tool mount preferably has radially pivotable retaining tongues, which are disposed for engaging in an annular groove, in particular in the internal mounting groove of the throttle valve. The mounting tool represents an independent object of the invention.

According to a further aspect of the invention, the solution of the above object is based on the provision of a fluid injection device comprising an injection tube on which injection end there is provided the throttle valve according to the invention, a pressure chamber for holding a pressure fluid and for providing a working pressure under which effect the annular piston of the throttle valve is displaceable, and a pressure source for generating the working pressure in the pressure fluid. Advantageously, a hydraulic control of the throttle valve in the bore hole is enabled therewith. The injection pressure of the fluid to be introduced into the geological formation can be adjusted underground directly at the injection horizon.

The fluid injection device according to the invention is preferably equipped with an outer tube, which forms the pressure chamber in conjunction with the injection tube. The inner diameter of the outer tube is greater than the outer diameter of the injection tube, so that an annular pressure chamber is formed.

Further advantages for the safety during the fluid injection into geological formations result from the provision of a pressure sensor device, which is arranged in the geological formation in connection with the fluid injection device or at the downstream free end of the injection tube or immediately adjoining the throttle valve within the injection tube. According to a variant of the invention it may be provided for the pressure source to be controllable using predetermined control signals, such as, for example, sensor signals of the pressure control device. The pressure sensor device enables, in particular, the creation of a control circuit by providing for the throttle valve to be actuated depending on the sensor signals of the pressure sensor device. Preferably, the working pressure in the pressure chamber is adjustable depending on the sensor signals. Advantageously, in this way there is provided an additional degree of freedom during the adjustment of the working pressure in the low-pressure side annular space depending on the pressure in the geological formation.

According to a further aspect of the invention, the solution of the abovementioned object is based on providing an injection method, wherein the throttle valve according to the invention is inserted in the injection tube of the fluid injection device and is adjusted by way of the working pressure in the surroundings of the throttle valve in such a way that the injection of the fluid, for example of the $CO_2$, takes place at a predetermined injection pressure. Advantageously, the method can be realized with great flexibility by inserting the injection tube comprising the throttle valve in an existing bore hole and arranging it for injecting a fluid.

BRIEF DESCRIPTION OF DRAWINGS

Further details and advantages of the invention will be described below with reference to the accompanying drawings, in which.

DETAILED DESCRIPTION

Figure 1:
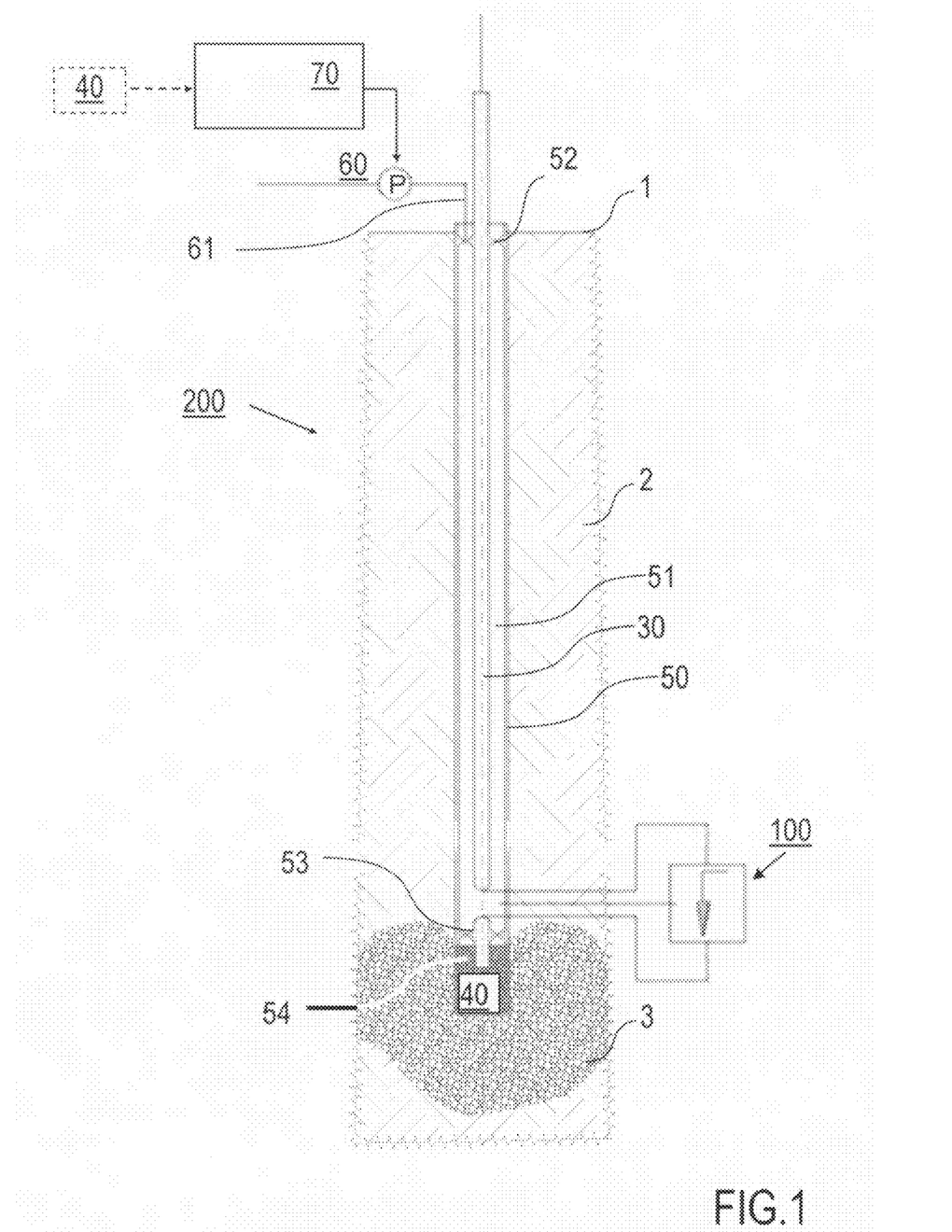
FIG. 1 shows an embodiment of a fluid injection device according to the invention.

FIG. 1 shows schematically the geological storage of carbon dioxide via an injection bore. The injection bore extends from the surface 1 of the earth crust 2 to the geological formation 3, in which the carbon dioxide is to be stored. The geological formation 3 comprises, for example, porous rock. The injection bore is illustrated in a vertical direction, it can however be tilted with respect to the vertical or even run horizontally.

The fluid injection device 200 according to the invention comprises in the injection bore the outer tube 50 with the injection tube 30 located therein. The annular pressure chamber 51, which is formed between the injection tube 30 and the outer tube 50, is closed by top and bottom packers 52, 53. The injection tube 30 runs through the top and the bottom packers 52, 53 as far as the lower end region 54 of the outer tube 50, in which the outer tube 50 is perforated. Furthermore, in the lower end region 54 there is a schematically shown pressure sensor device 40 (for example with an optical pressure sensor, such as the "Optical sensor mandrel", manufacturer Weatherford) for measuring the pressure in the geological formation 3.

The outer tube 50 is cemented into the earth crust 2. The depth of the injection bore extending as far as the geological formation 3 is, for example, 800 m. The ambient pressure at this depth is of approximately 80 bar. When feeding liquefied carbon dioxide, the condensation pressure of which on the surface 1 of the earth crust 2 is already approximately 65 bar at 25° C., this ambient pressure would be significantly exceeded by the liquid column formed in the injection tube 30 in the geological formation 3. The throttle valve 100 is provided for reducing the fluid pressure at the point of injection.

The dimensions of the injection bore and of the throttle valve 100 are selected depending on the conditions of the concrete application, in particular depending on the fluid to be injected per unit of time.

The throttle valve 100 according to the invention is arranged in the injection tube 30. In accordance with the schematically magnified illustration, the throttle valve 100 is located at the lower end of the injection tube 30, immediately above the bottom packer 53. Details on the throttle valve 100 and its control using the working pressure of the pressure fluid in the pressure chamber 51 are described below with reference to FIGS. 2 and 3. According to the invention, the throttle valve 100 is controlled by means of the hydraulic pressure of the pressure fluid in the pressure chamber 51. According to an important feature of the invention, the water available in the annular space, which can have a corrosion inhibiting additive added thereto, is used as pressure fluid. In this way, advantageously, no additional lines or media are necessary for pressure transfer, but only the liquid column already present in the sealed annular space of the bore is necessary.

In order to have the working pressure applied thereto, the pressure chamber 51 is connected to the pressure source 60 via a pressure line 61, which runs through the top packer 52. The pressure source 60 comprises a pressure generator such as, for example, a compressor or a mechanically actuated piston, for generating the working pressure in the region of, for example, up to 20 bar. The pressure source 60 is connected to a control device 70. Preferably, the control device 70 is also connected to the pressure sensor device 40 (see dashed arrow) in order to adjust the working pressure in the pressure chamber 51 via the pressure source 60 depending on the pressure in the end region 54 of the outer tube 50.

Figure 2:
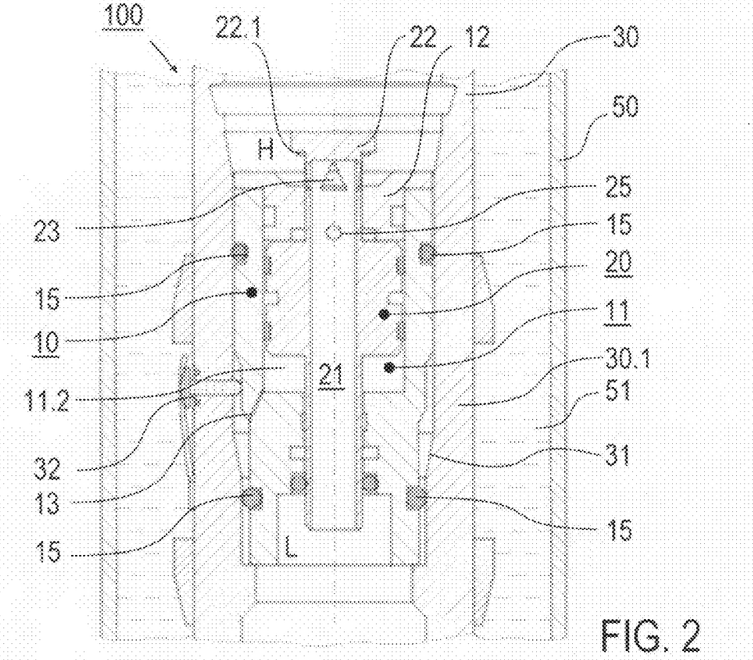
FIGS. 2 and 3 show sectional views of a preferred embodiment of the throttle valve according to the invention in the open and in the closed state.
Figure 3:
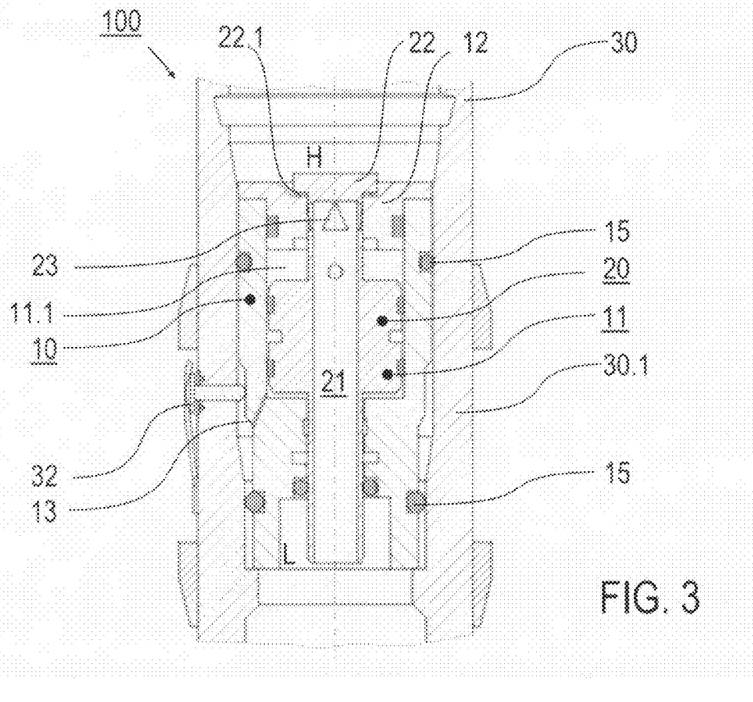

The function of the throttle valve 100 will be described below with reference to the open state (FIG. 2) and the closed state (FIG. 3).

FIG. 2 shows the lower part of the fluid injection device comprising the outer tube 50 and the injection tube 30, between which the pressure chamber 51 with the pressure fluid is formed. The throttle valve 100 according to the invention comprises a valve body 10, which extends in longitudinal direction of the injection tube 30 and an inner piston chamber 11, a cover plate 12, a throttle line 13 and radially acting sealing elements 15 (O-rings). The valve body 10 is arranged in a valve seat 30.1, which is part of the injection tube 30 and has internal inclined leading surfaces 31. The throttle valve 100 has, apart from the throttle line 13 and details of the fluid channel 21 (see below), a rotationally-symmetrical design.

The end of the piston chamber 11, which is closed with the cover plate 12, is provided on the high-pressure side H of the throttle valve 100, where there is, for example, a pressure of the liquid column of the carbon dioxide in the injection tube 30 of about 110 bar. The opposite end of the valve body 10 faces the low-pressure side L, where a pressure of, for example, 80 bar is to be adjusted.

The rotationally-symmetrical annular piston 20 comprising the axial fluid channel 21 is provided in the piston chamber 11. The annular piston 20 is arranged in the piston chamber 11 in such a way that it seals radially in longitudinal direction and is axially displaceable. The fluid channel 21 is arranged in the valve body 10 between the high-pressure side H and the low-pressure side L. The end of the fluid channel 21 on the high-pressure side H is closed off by a sealing disk 22, which, relative to the outer shape of the fluid channel 21, has a projection with an annular seal 22.1. A throttle opening 23 is provided adjacent to the sealing disk 22, in the wall of the fluid channel 21. Furthermore, a connection opening 25 is provided in the wall of the fluid channel 21 in order to connect the fluid channel 21 with the piston chamber 11.

The illustrated valve design can be advantageously used to adjust the injection pressure on the low-pressure side L by throttling with the throttle opening 23. For adjusting the pressure, the throttle opening 23 is provided with a specific throttle contour, which widens in axial direction of the fluid channel 21 toward the low-pressure side L. The throttle contour is created, for example, by milling out the fluid channel 21. A triangular contour is advantageously provided.

The piston chamber 11 is divided by the annular piston 20 into the high-pressure side annular space 11.1 (see FIG. 3, illustration without the outer tube 50 and the pressure chamber 51) and the low-pressure side annular space 11.2 (see FIG. 2). Depending on the pressure difference between the high-pressure side annular space 11.1 and the low-pressure side annular space 11.2, the annular piston can be displaced in the piston chamber 11 in such a way that the throttle opening 23 is freed (see FIG. 2) or closed (see FIG. 3). For the adjustment of the open state (flow-through state), the working pressure in the pressure chamber 51 is increased in such a way that the upward-acting control pressure in the low-pressure side annular space 11.2 exceeds the downward acting force of the pressure on the high-pressure side H, which is generated by the fluid to be injected and the pressure in the reservoir. The working pressure is transferred hydraulically via the opening valve 32 and the throttle line 13 into the low-pressure side annular space 11.2, while, as a result of the fluid connection via the throttle opening 23 and the connection opening 25, the pressure in the high-pressure side annular space 11.1 is that of the high-pressure side H of the throttle valve 100. Accordingly, the fluid can flow from the high-pressure side via the throttle opening 23 through the fluid channel 21 to the low-pressure side and also through the connection opening 25 into the high-pressure side annular space 11.1.

The actual pressure can be measured on the low-pressure side L by means of the pressure sensor device 40 (see FIG. 1). When the pressure exceeds a predetermined safety pressure, then the throttle valve 100 is partially or completely closed. For this, the working pressure in the pressure chamber 51 is reduced, so that, accordingly, the pressure in the low-pressure side annular space 11.2 also falls. The displacement of the annular piston 20 results from the effect of the fluid pressure on the high-pressure side H, which is transferred onto the high-pressure side annular space 11.1. During this process, the fluid channel 21 is first displaced in such a way that the throttle opening 23 is partially covered by the axial extension of the cover plate 12 (thickness of the cover plate 12). Accordingly, the flow-through capacity of the throttle valve 100 is reduced. When further decreasing the pressure in the low-pressure side annular space 11.2, the fluid channel 21 comprising the annular piston 20 is displaced until the sealing disk 22 is seated on the cover plate 12 (see FIG. 3). In this situation, the throttle valve 100 is in the closed state. The fluid channel 21 is completely closed by the seal 22.1.

In the open state, the liquid fluid, for example carbon dioxide, flows from the high-pressure side H to the throttle valve 100, where it first passes the throttle opening 23, where the desired pressure reduction takes place. With reduced pressure, the fluid flows through the fluid channel 21 on the low-pressure side of the throttle valve 100 into the geological formation 3. The adjustment of the surface of the throttle opening 23 and with it of the pressure drop takes place by the axial displacement of the annular piston 20 in the valve body 10. The position of the throttle contour relative to the cover plate 12, which forms a constriction, determines the pressure drop. The pressure drop is also dependent on the volume flow.

The control of the annular piston in the throttle valve 100 takes place by means of a differential pressure control system. The balance of forces at the annular piston comprises two partial forces which are directed (downward) toward the low-pressure side L and which are the result of the pressure of the unthrottled fluid on the effective top side of the throttle valve, in particular the top side of the sealing disk 22, and of the throttled pressure of the fluid in the high-pressure side piston chamber 11.1, and a partial force which is directed (upward) toward the high-pressure side H and which is the result of the working pressure of the pressure fluid in the pressure chamber 51 and in the low-pressure side piston chamber 11.2, respectively. The control of the working pressure with the pressure source 60 (see FIG. 1) enables this balance of forces to be influenced in such a way that a predetermined pressure drop is adjusted at the throttle opening 23. The throttle valve 100 is opened by increasing the pressure in the pressure chamber 51 in such a way that the upward acting force is greater than the resultant downward acting force at the annular piston 20. The setting of the throttle opening can thus be regulated by adjusting a suitable differential pressure at the annular piston. As soon as the working pressure drops, the throttle valve 100 closes automatically, since, in this case, only the downward partial forces are active.

The adjustment of the differential pressure can take place depending on the measured pressure in the geological formation 3 using a control circuit including the control device 70 and the pressure source 60 (see FIG. 1). A control algorithm which uses the actual pressure at the injection horizon in the geological formation 3 as control variable can be implemented in the control circuit. As soon as the pressure at the injection horizon exceeds a predetermined safety pressure, the working pressure in the pressure chamber 51 and hence in the piston chamber 11.2 on the low-pressure side is reduced, so that the annular piston 20 is displaced downward and the throttle opening 23 is reduced in size.

An abrupt draining of the pressure fluid from the low-pressure side annular space 11.2 is avoided by the dimensioning of the throttle line 13. The diameter of the throttle line 13 is typically less than 5 mm, it can, however, be alternatively selected larger, particularly depending on the fluid to be injected per unit of time. If, on the other hand, the pressure in the geological formation increases unexpectedly, for example for geophysical reasons, then this pressure increase affects as far as the high-pressure side annular space 11.1. As a result, the downward directed partial force is increased at the annular piston 20, so that the throttle valve 100 closes. Advantageously, the inadvertent loading of a faulty geological storage is excluded as a result.

The throttle valve 100 is advantageously separable from the injection tube 30, if required, so that the complete line cross section of the injection tube 30 is available, for example, for maintenance work in the lower tube sections or for measurements in the bore hole. The positioning and separation of the throttle valve 100 in and from the valve seat 30.1, as the case may be, is preferably carried out using a mounting tool 80 and a drawing tool 90. The function of the tools 80, 90 is illustrated in the FIGS. 4 and 5.

Figure 4:
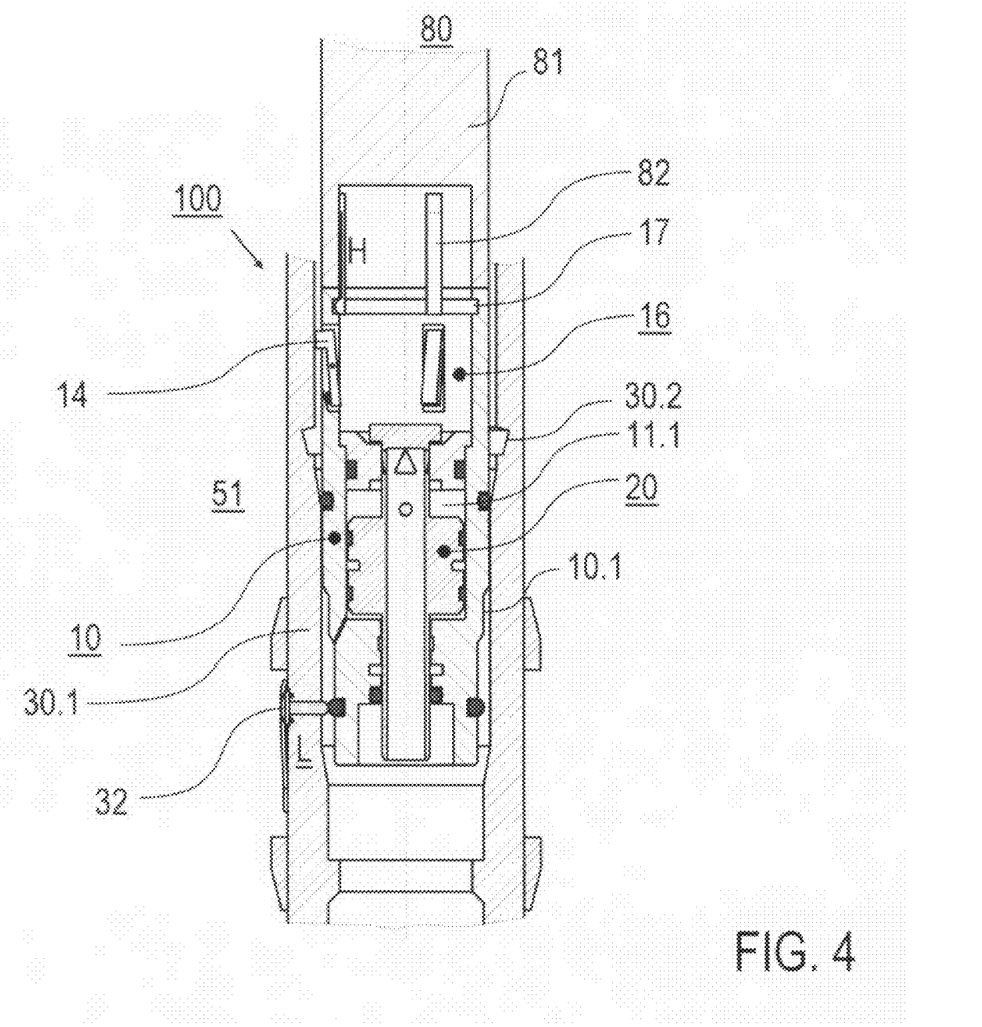
FIGS. 4 and 5 show sectional views of a further preferred embodiment of the throttle valve according to the invention comprising a mounting tool and comprising a drawing tool.

In the embodiment of the throttle valve 100 according to the invention shown in FIG. 4 there is provided on its high-pressure side a hollow-cylindrical tool mount 16 having radial locking levers 14 and an internal mounting groove 17. The mounting tool 80 comprises a solid tool carrier 81, which has elastically deflectable retaining tongues 82 on its lower end. The elastically deflectable retaining tongues 82 are pivotable relative to the longitudinal extension of the tool carrier 81 and laid out for engagement into the mounting groove 17.

Figure 5:
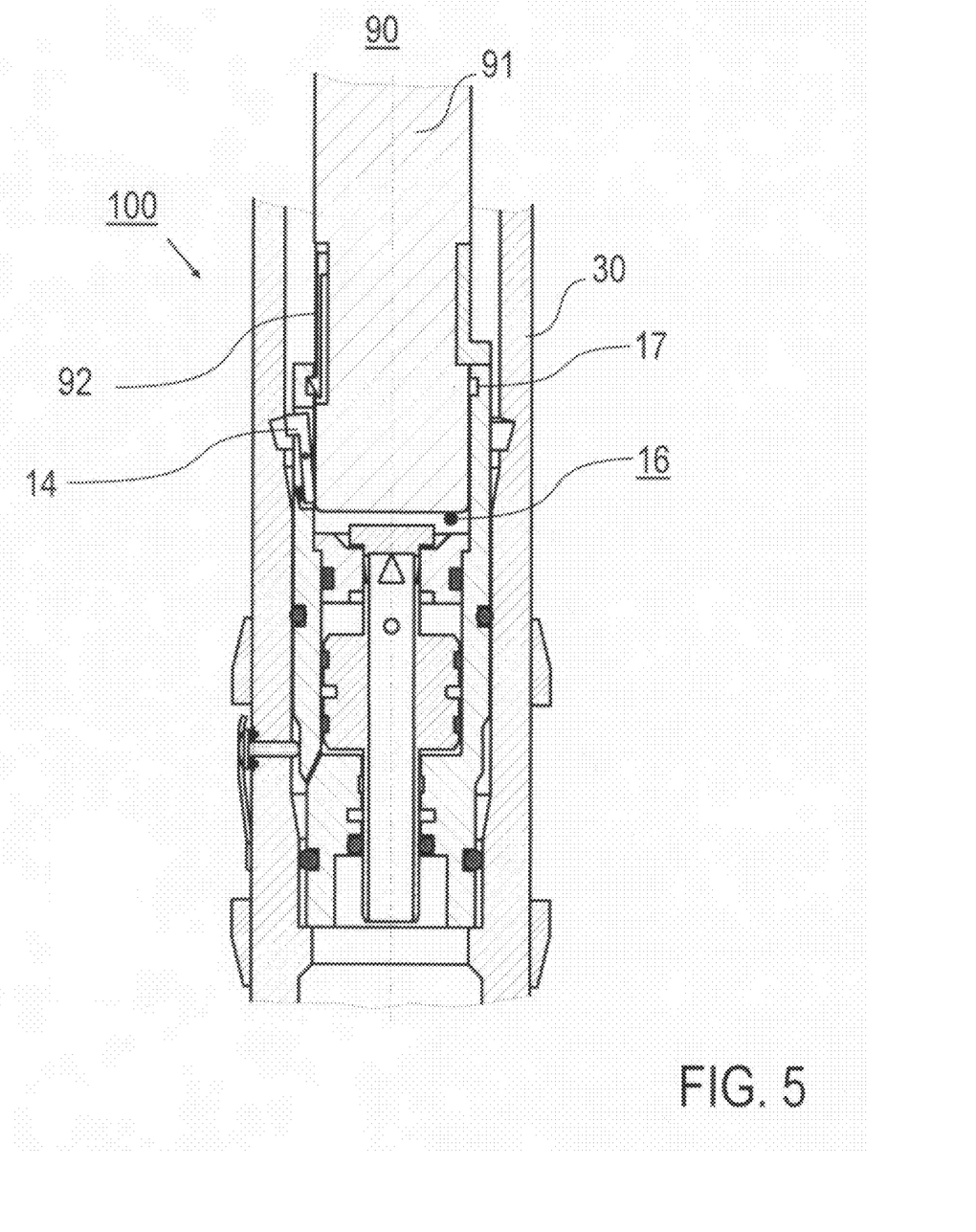

When inserting the throttle valve 100 (FIG. 4), the throttle valve 100 hangs with the mounting groove 17 and the retaining tongues 82 on the mounting tool 80. As soon as the throttle valve reaches the valve seat 30.1 by lowering the mounting tool 80, the opening valve 32 is opened by the inclined leading surface 10.1 on the outer side of the valve body 10, so that the low-pressure side annular space 11.2 has the working pressure in the pressure chamber 51 applied thereto. Accordingly, a displacement of the annular piston 20 to the high-pressure side H takes place, so that the throttle valve 100 is open. At the same time, the locking levers 14 engage in a locking groove 30.2 of the valve seat 30.1, thus fixing the throttle valve 100 (FIG. 5). In this situation, the mounting tool 80 can be released from the tool mount 16, with the retaining tongues 82 disengaging from the mounting groove 17, and drawn back through the injection tube 30.

The removal of the throttle valve 100 is carried out in reverse by inserting a drawing tool 90 in the tool mount 16 and drawing back the throttle valve 100 with the drawing tool 90. The drawing tool 90 comprises a tool body 91 and a drawing hook 92. When inserting the drawing tool 90, the tool body 91 is immersed in the upper region of the valve, so that the inward-protruding lower halves of the locking levers 14 are pressed outward, so that the upper halves are folded in and the valve is released in the valve seat. The drawing hooks 92 engage in the mounting groove 15, so that the valve can be drawn out of the bore with the drawing tool 90. In the dismounted state, the interior of the injection tube 30 is separated from the outer pressure chamber 51, since the opening valve 33 is closed. Advantageously, a hydraulic decoupling from the pressure chamber 51 is achieved in this way.

The characteristics of the invention disclosed in the above description, recited in the Claims and shown in the drawings, may be important for the realization of the invention in its various embodiments either individually as well as in combination.

The invention claimed is:

1. A throttle valve comprising:
   a valve body having a piston chamber,
   an annular piston having an axial fluid channel, which extends from a high-pressure side to a low-pressure side of the throttle valve, with the annular piston being displaceable within the piston chamber and the fluid channels being transmissive or closed depending on the position of the annular piston in the piston chamber,
   a cover plate which is provided on the high-pressure side of the valve body and through which the fluid channel protrudes from the piston chamber to the high-pressure side,
   wherein
   the fluid channels is closed in axial direction with a sealing disk, which can be rested tightly on the cover plate on the high-pressure sides, and
   the fluid channel has a radial throttle opening adjacent to the sealing disks.

2. The throttle valve according to claim 1, in which the throttle opening has throttle contour which widens in axial direction toward the low-pressure side.

3. The throttle valve according to claim 1, in which the annular piston has a piston body, through which the piston chamber is divided into a high-pressure side annular space and a low-pressure side annular space, wherein the low-pressure side annular space is arranged to have a working pressure in the surroundings of the valve body applied thereto.

4. The throttle valve according to claim 3, in which the fluid channel is connected with the high-pressure side annular space via a radial connection opening.

5. The throttle valve according to claim 3 in which the low-pressure side annular space is connected with the surroundings of the valve body via a throttle line.

6. The throttle valve according to claim 1, in which the surface of the valve body has a radially symmetric outer contour.

7. The throttle valve according to claim 1, in which radially acting sealing elements are provided on a surface of the valve body.

8. The throttle valve according to claim 1, wherein the throttle valve has a valve seat which is part of an injection tube.

9. The throttle valve according to claim 8, in which an opening valve is provided in the valve seats to form a connection between the surroundings of the injection tube and the throttle valve.

10. The throttle valve according to claim 9, in which the throttle line is connected with the opening valve.

11. The throttle valve according to claim 9, in which the opening valve can be actuated by inserting the valve body in the valve seat.

12. The throttle valve according to claim 1, in which the valve body has an engagement device, which comprises at least one selected from the group consisting of radial locking lever and internal mounting groove.

13. The throttle valve according to claim 12, in which the valve body has a tool mount in which the internal mounting groove and the at least one radial locking lever are provided, wherein a mounting tool is insertable in the tool mount, with which at least one radial locking lever can be actuated in the inserted state.

14. The throttle valve according to claim 13, wherein the throttle valve is connected with the mounting tool.

15. The throttle valve according to claim 14, in which the mounting tool comprises retaining tongues which engage in the internal mounting groove.

16. A fluid injection device comprising:
    an injection tube, in which a throttle valve is disposed which comprises a valve body having a piston chamber, an annular piston having an axial fluid channel, which extends from a high-pressure side to a low-pressure side of the throttle valve, with the annular piston being displaceable within the piston chamber and the fluid channel being transmissive or closed depending on the position of the annular piston in the piston chamber, a cover plate which is provided on the high-pressure side of the valve body and through which the fluid channel protrudes from the piston chamber to the high-pressure side, wherein the fluid channel is closed in axial direction with a sealing disk, which can be rested tightly on the cover plate on the high-pressure side, and wherein the fluid channel has a radial throttle opening adjacent to the sealing disk,
    a pressure chamber for the generation of a working pressure in the surroundings of the throttle valve, and
    a pressure source for applying the working pressure to the pressure chamber.

17. The fluid injection device according to claim 16, which comprises an outer tube in which the injection tube is disposed, wherein the pressure chamber is formed between the outer tube and the injection tube.

18. The fluid injection device according to claim 16, wherein the fluid injection device is equipped with a pressure sensor device.

19. The fluid injection device according to claim 18, comprising a control circuit with which the throttle valve can be actuated depending on sensor signals of the pressure sensor device.

20. The fluid injection device according to claim 16, in which the injection tube comprises a valve seat having inclined leading surfaces for taking up the throttle valve.

21. The fluid injection device according to claim 16, in which water available in the pressure chamber is used as pressure fluid.

22. A method for injecting a fluid into a geological formation, comprising the steps of:
    inserting a throttle valve in an injection tube protruding into the geological formation, wherein the throttle valve comprises a valve body having a piston chamber, an annular piston having an axial fluid channel, which extends from a high-pressure side to a low-pressure side of the throttle valve, with the annular piston being displaceable within the piston chamber and the fluid channel being transmissive or closed depending on the position of the annular piston in the piston chamber, a cover plate which is provided on the high-pressure side of the valve body and through which the fluid channel protrudes from the piston chamber to the high-pressure side, wherein the fluid channel is closed in axial direction with a sealing disk, which can be rested tightly on the cover plate on the high-pressure side, and wherein the fluid channel has a radial throttle opening adjacent to the sealing disk, adjusting the throttle valve via a working pressure in the surroundings of the injection tube, and injecting the fluid into the geological formation via the injection tube and the throttle valve.

23. The method according to claim 22, in which the working pressure is generated in an annular space between the injection tube and an outer tube.

24. The method according to claim 23, in which the working pressure is exerted on the throttle valve via the opening valve and the throttle line.

25. The method according to claim 24, in which the opening valve is opened with the insertion of the throttle valve into the injection tube.

26. The method according to claim 22, in which the working pressure is adjusted depending on an operating pressure downstream of the throttle valve.

27. The method according to claim 22, in which the insertion of the throttle valve comprises a releasable fastening in a valve seat of the injection tube.

28. The method according to claim 27, in which the insertion of the throttle valve comprises introducing a mounting tool into the injection tube until radial locking levers of the valve body of the throttle valve (engage in a locking groove in the interior of the injection tube.

29. The method according to claim 28, further comprising drawing off of the throttle valve introducing a drawing tool into the injection tube until a tool body of the drawing tool releases the radial locking levers from the locking groove.

30. The method according to claim 22, in which the injected fluid comprises liquid carbon dioxide.

31. A method of using a throttle valve for injecting liquid carbon dioxide into a geological formation, wherein the throttle valve comprises:

a valve body having a piston chamber, an annular piston having an axial fluid channel, which extends from a high-pressure side to a low-pressure side of the throttle valve, with the annular piston being displaceable within the piston chamber and the fluid channel being transmissive or closed depending on the position of the annular piston in the piston chamber, a cover plate which is provided on the high-pressure side of the valve body and through which the fluid channel protrudes from the piston chamber to the high-pressure side, the method comprising:

closing the fluid channel in the axial direction with a sealing disk, which can be rested tightly on the cover plate on the high-pressure side, wherein the fluid channel has a radial throttle opening adjacent to the sealing disk.

32. A method of using a fluid injection device for injecting liquid carbon dioxide into a geological formation, wherein the fluid injection device comprises:

an injection tube, in which a throttle valve is disposed which comprises a valve body having a piston chamber, an annular piston having an axial fluid channel, which extends from a high-pressure side to a low-pressure side of the throttle valve, with the annular piston being displaceable within the piston chamber and the fluid channel being transmissive or closed depending on the position of the annular piston in the piston chamber, a cover plate which is provided on the high-pressure side of the valve body and through which the fluid channel protrudes from the piston chamber to the high-pressure side, wherein the fluid channel is closed in axial direction with a sealing disk, which can be rested tightly on the cover plate on the high-pressure side, and wherein the fluid channel has a radial throttle opening adjacent to the sealing disk, a pressure chamber, and a pressure source;

the method comprising:

generating a working pressure in the surroundings of the throttle valve; and applying the working pressure from the pressure source to the pressure chamber.

\* \* \* \* \*

UNITED STATES PATENT AND TRADEMARK OFFICE
CERTIFICATE OF CORRECTION

| | | |
|---|---|---|
| PATENT NO. | : 7,640,992 B2 | Page 1 of 1 |
| APPLICATION NO. | : 11/810815 | |
| DATED | : January 5, 2010 | |
| INVENTOR(S) | : Andreas Jurczyk et al. | |

It is certified that error appears in the above-identified patent and that said Letters Patent is hereby corrected as shown below:

Title Page, insert Item [30] Foreign Application Priority Data

-- Jun. 14, 2006   (DE)............................ 10 2006 027 705.8 --.

Signed and Sealed this

Tenth Day of August, 2010

David J. Kappos
*Director of the United States Patent and Trademark Office*